United States Patent Office 2,766,965
Patented Oct. 16, 1956

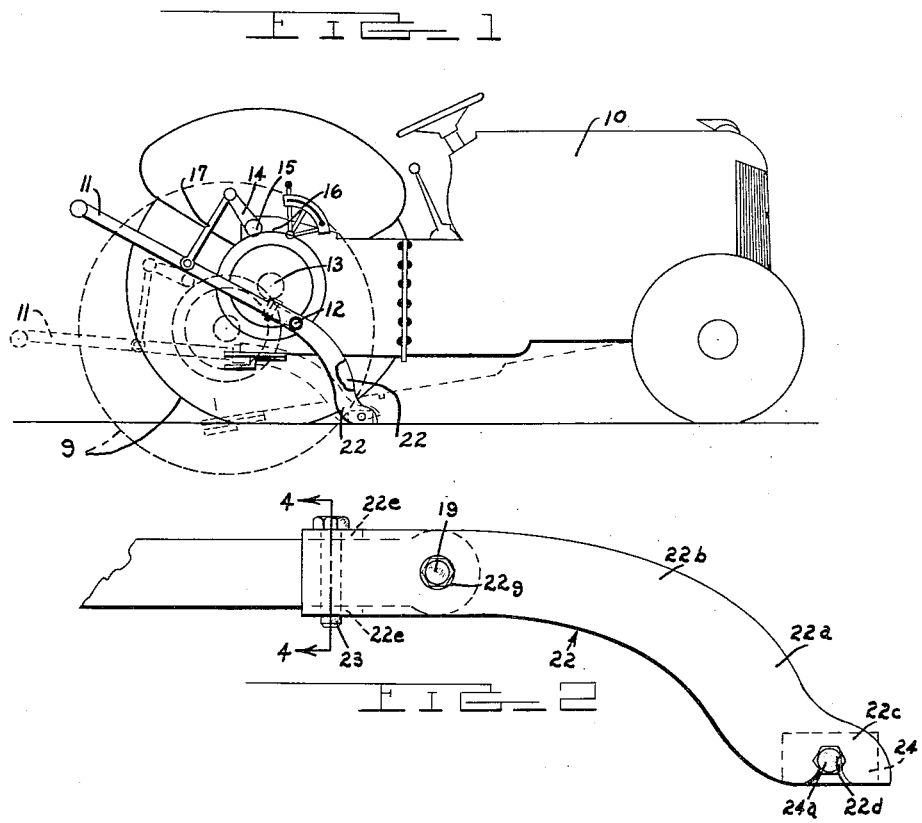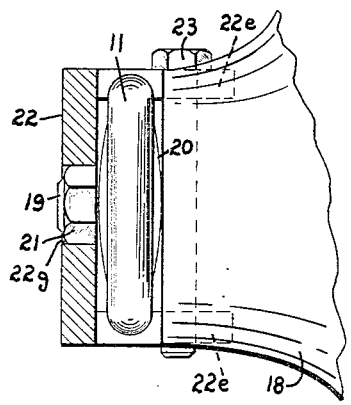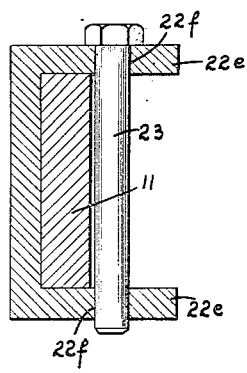

2,766,965
TRACTOR JACK ATTACHMENT

Wilbur A. Schaich, Goodrich, Mich., assignor, by mesne assignments, to Ford Motor Company, Dearborn, Mich., a corporation of Delaware Application January 23, 1952, Serial No. 267,879

4 Claims. (Cl. 254—124)

This invention relates to a tractor jack and more particularly to attachments for the power-lifted hitch linkage of a tractor to convert such linkage to a power operated jack.

In the course of fitting the soil with tractor drawn implements, it occasionally happens that the tractor passes over wet or soft ground and before the tractor operator has time to adjust the implement to a nonworking position, the tractor rear wheels have buried themselves to such an extent that the bottom of the differential housing is contacting the ground. This condition makes it practically impossible to place a jack under the rear axle and elevate the rear wheels sufficiently to permit placing planks thereunder in order to move the tractor ahead to firmer ground. Of course, the dirt can be removed under the axle to permit the insertion of a jack thereunder but such procedure consumes not a little time and considerable effort.

The well-known Ford tractor has a pair of power-lifted trailing hitch links which are utilized for raising and lowering implements from and to a working position. Such hitch links are universally pivoted to the tractor rear axle housing at laterally spaced points and are vertically spaced a substantial distance above the bottom of the tractor differential housing. As the hitch links are readily freed from the implement when the tractor has bogged down, they could be utilized to assist in elevating the tractor rear end to facilitate freeing of the tractor from its buried condition, but they are hydraulically energized only to move upwardly relative to the tractor.

Accordingly, it is an object of this invention to provide an attachment for the power-lifted hitch links of a tractor for elevating the tractor rear wheels.

Another object of this invention is to provide attachments for a tractor having a pair of unidirectionally actuated, power-lifted hitch links for utilization of such hitch links for raising the tractor rear end.

Another object of this invention is to provide a jack attachment for the power-lifted hitch links of a tractor of well-known make which is of simple design and hence economical to manufacture and which conveniently permits the use of the power-lifted links for elevating the tractor rear end.

The specific nature of this invention, as well as other objects and advantages thereof, will become apparent to those skilled in the art from the following detailed description, taken in conjunction with the attached drawing on which, by way of preferred example only, is illustrated one embodiment of this invention.

On the drawings:

Figure 1 is a side elevational view of a tractor of well-known make with one rear wheel removed showing the jack attachments mounted on the hitch links of such tractor, one of the jack attachments being partially broken away to show the other jack attachment;

Figure 2 is an enlarged detail side elevational view of one of the attachments shown mounted on one of the tractor hitch links;

Figure 3 is an enlarged fragmentary detail front end view illustrating the mounting of the hitch link, shown in side elevation in Figure 1, to bosses provided on the underside of the tractor rear axle housing and also showing the mounting of the jack attachment thereon; and Figure 4 is an enlarged cross sectional detail view taken along the plane 4—4 of Figure 2.

As shown on the drawings:

In Figure 1 there is shown a tractor 10 of well-known make which has a pair of hitch links 11 secured at laterally spaced points 12 to the tractor rear axle housing 13. Tractor 10 has a pair of lift arms 14 respectively secured to the ends of a laterally disposed rock shaft 15 journaled in the upper portion of the tractor transmission housing 16. The rock arms 14 are connected by links 17 to a median portion of hitch links 11. Rock shaft 15 is rotated by a built-in hydraulic mechanism to effect vertical movement of the rock arms 14 and hence of the hitch links 11.

In Figure 3 there is shown an enlarged detail view of the mounting of one of the hitch links 11 to the tractor rear axle housing 13. A pair of integral horizontally disposed bosses 18 (only one of which is shown) are provided on the underside of the tractor axle housing 13 on opposite sides of the differential housing and each boss 18 has a horizontal stud 19 suitably secured therein. The forward ends of the hitch links 11 have a spherical type, universally swiveling connecting joint 20 which is apertured to permit mounting the forward ends of the hitch links 11 on the studs 19. A nut 21 screwed onto the threaded outer end of each stud 19 prevents displacement of hitch links 11 from studs 19.

The jack attachment constructed in accordance with this invention is essentially an extension of the hitch links 11. The jack attachment comprises a bar-like extension member 22 of generally rectangular cross section. The fore portion 22a of the bar 22 is bent downwardly and forwardly as shown at 22b and the extreme forward end terminates in a more or less rounded end portion 22c. A substantially semi-cylindrical notch 22d is provided on the underside of forward tip portion 22c for a purpose to be later described.

The extreme rear end of the bar 22 has a pair of horizontal inwardly disposed ears 22e. The ears 22e are vertically spaced apart, as best shown in Figure 4, in vertically disposed alignment and a pair of vertically aligned apertures 22f are respectively provided in the ears 22e. A headed pin 23 is insertable in aligned vertical apertures 22f for a purpose to be presently described. Somewhat forwardly of the ears 22e, there is provided in bar 22 a transverse hole 22g. The hole 22g is of such a size as to permit the bar 22 to be snugly mounted over the nut 21 adjacent link 11. The ears 22e provided on the extreme rear end of the bar 22 snugly receives the hitch link 11 and when the ears surround hitch link 11, the pin 23 may be inserted through the vertically aligned holes 22f to secure the bar 22 to the hitch link 11. It should, of course, be understood that an identical bar 22 is similarly mounted on the other hitch link 11. The only difference between the two bars 22 is that the vertically spaced ears 22e will have to project from opposite sides of the bar 22.

When the jack attachments or bars 22 are mounted on the forward ends of the links 11, the usual tractor drawbar 24, which has cylindrical end pins 24a, is transversely mounted on the attachments 22, the semi-circular notches 22d conveniently accept the end pins 24a. The drawbar 24 is inserted under the tractor transmission housing and normally rests on the ground. Under certain conditions it may be desirable to insert a plank or other board between the ground surface on which the tractor rests and the bottom surface of the drawbar 24.

The links 11 with the attachments 22 mounted thereon and with drawbar 24 in place as shown in Figure 1 define in effect a stand rockable vertically in accordance with the movement of the power lifted hitch links 11, and as the inclined length of such attachments is greater than the vertical distance of the pivot point 12 of the links 11 from the ground, the tractor rear end will be elevated when such links are raised.

In the operation of the jack attachments above described, assume that the tractor rear wheels have sunk into the ground, as when encountering a soft spot or hole, to approximately the level shown in dotted outline in Figure 1. The hitch links 11 shown in their lowered position in dotted outline are raised by actuating the rock arms 14. The tractor front wheels will then roll forwardly somewhat until the tractor rear wheels are raised to the position shown in full outline in Figure 1. At this point the wheels may be blocked up whereupon the hitch links may then be lowered and the tractor driven to firmer ground.

The jack attachments 22 may also be conveniently used for elevating the rear end of the tractor to permit changing of the wheels as in a garage or on firm ground. Essentially the same steps as above outlined are followed for so doing. In the event it is desired to raise but one of the rear wheels from the ground, a suitable block may then be so positioned under the tractor so that only one of the jack attachments 22 rests on the block. Drawbar 24 will not be utilized in such case.

From the above description it is clearly apparent that there is here provided a pair of attaching members for a tractor having a pair of power lifted hitch links which may be quickly and easily assembled thereto to permit using such hitch links as a self-powered jack to elevate the rear end of the tractor. These attaching members are of extremely simple design and yet are of sturdy construction which thereby provides an inexpensive and convenient means for utilizing the power lifted hitch links of the tractor as jacks for elevation of the tractor rear end, and particularly when the tractor is mired.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of laterally spaced power lifted hitch links pivotally connected to the tractor in trailing relationship and a transverse drawbar normally mounted on the trailing ends of the hitch links, a pair of jack attachments for the hitch links each comprising a rigid bar having its front end portion offset vertically downwardly from its rear end portion, means on the medial portions of each of said bars for respectively detachably mounting such bars in coaxial relationship respectively to the hitch links, means for respectively securing the rear ends of the bars to the hitch links, and a downwardly opening notch in each of said forward end portions of said bars for respectively receiving the ends of the transverse drawbar, said transverse drawbar and said bars comprising a structure on which the tractor is elevated when the hitch links are raised.

2. The combination defined in claim 1 wherein said means for securing the rear end of each of the bars to the hitch links comprises a pair of horizontal ears on said rear end of the bar vertically spaced to receive the hitch link therebetween, said ears respectively having aligned vertical apertures, and a pin member insertable in said aligned apertures when the hitch link lies between said ears.

3. For use with a tractor having a pair of laterally spaced power lifted hitch links pivotally connected to the tractor by headed studs in trailing relationship and a transverse drawbar normally mounted on the trailing ends of the hitch links, a pair of jack attachments for the hitch links each comprising a rigid bar having its front end portion offset vertically downwardly from its rear end portion, said bars respectively having a transverse aperture adjacent their rear ends for respectively removably pivotally mounting such bars on the headed studs, means for detachably securing the rear ends of the bars to the hitch links, and a downwardly opening notch in each of said forward end portions of said bars for respectively receiving the ends of the transverse drawbar, said transverse drawbar and said bars comprising a structure on which the tractor is elevated when the hitch links are raised.

4. For use with a tractor having a pair of laterally spaced power lifted hitch links pivotally connected to the tractor in trailing relationship by headed studs and a transverse drawbar normally mounted on the trailing ends of the hitch links, a pair of jack attachments for the hitch links each comprising a rigid bar having its front end portion offset vertically downwardly from its rear end portion, said bars respectively having a transverse aperture adjacent their rear ends for respectively removably pivotally mounting such bars on the headed studs, a pair of horizontal ears on said rear end of the bar member vertically spaced to receive the adjacent hitch link therebetween, said ears respectively having aligned vertical apertures, and a pin member insertable in said aligned apertures when the hitch link lies between said ears, and vertical slot means on said forward end portions of said bars for respectively receiving the ends of the transverse drawbar, said transverse drawbar and said bars comprising a structure on which the tractor is elevated when the hitch links are raised.

References Cited in the file of this patent

UNITED STATES PATENTS

| 1,939,950 | Brown | Dec. 19, 1933 |

FOREIGN PATENTS

| 592,175 | Great Britain | Sept. 10, 1947 |
| 269,593 | Switzerland | July 15, 1950 |